(12) United States Patent
Whitehead

(10) Patent No.: US 7,082,721 B2
(45) Date of Patent: Aug. 1, 2006

(54) ILLUMINATING WEATHERSEAL

(75) Inventor: William Whitehead, Maryville, TN (US)

(73) Assignee: Schlegel Corporation, New York, NY (US)

( * ) Notice: Subject to any disclaimer, the term of this patent is extended or adjusted under 35 U.S.C. 154(b) by 0 days.

(21) Appl. No.: 10/474,261

(22) PCT Filed: Apr. 12, 2002

(86) PCT No.: PCT/US02/11704

§ 371 (c)(1),
(2), (4) Date: Oct. 3, 2003

(87) PCT Pub. No.: WO02/085656

PCT Pub. Date: Oct. 31, 2002

(65) Prior Publication Data

US 2004/0144035 A1    Jul. 29, 2004

Related U.S. Application Data

(63) Continuation of application No. 09/837,039, filed on Apr. 18, 2001, now abandoned.

(51) Int. Cl.
*E06B 7/16* (2006.01)
(52) U.S. Cl. ............... 49/490.1; 49/498.1; 49/475.1; 277/919
(58) Field of Classification Search ............ 49/475.1, 49/490.1, 498.1; 277/919; 362/501
See application file for complete search history.

(56) References Cited

U.S. PATENT DOCUMENTS

| | | | | |
|---|---|---|---|---|
| 3,590,768 A | * | 7/1971 | Shanok et al. ............ 116/28 R |
| 4,419,844 A | * | 12/1983 | Kreisfeld ................ 49/475.1 |
| 4,494,326 A | | 1/1985 | Kanamori | |
| 4,758,931 A | * | 7/1988 | Gabaldon ................ 362/503 |
| 4,934,753 A | | 6/1990 | Gajewski | |
| 4,937,029 A | * | 6/1990 | Ishiharada et al. ......... 264/1.27 |
| 4,993,774 A | * | 2/1991 | Greenhalgh et al. ........ 296/201 |
| 5,016,145 A | * | 5/1991 | Singleton ................ 362/503 |
| 5,025,351 A | * | 6/1991 | Martin .................. 362/506 |
| 5,122,933 A | | 6/1992 | Johnson | |
| 5,163,731 A | * | 11/1992 | Gold .................... 296/201 |
| 5,180,223 A | * | 1/1993 | McNamee ................ 362/223 |
| 5,193,895 A | | 3/1993 | Naruke et al. | |
| 5,211,466 A | * | 5/1993 | Jarocki et al. ............. 362/540 |

(Continued)

FOREIGN PATENT DOCUMENTS

DE    19744240    4/1999

(Continued)

OTHER PUBLICATIONS

"Co extruded linear light guides look set for a bright future", European Automotive Design, Apr. 2001.

(Continued)

*Primary Examiner*—Gregory J. Strimbu
(74) *Attorney, Agent, or Firm*—Brian B. Shaw, Esq.; Steven B. Salai, Esq.; Harter, Secrest & Emery LLP

(57) ABSTRACT

An illuminating weatherseal (10) can seal a gap between confronting surfaces and illuminate the adjacent environment. The illuminating weatherseal includes a light emitting line (80) extending along a longitudinal dimension of the weatherseal (10), wherein the light is emitted from the light emitting line (80) along a path non coincident with the longitudinal dimension. A switch can be incorporated into the illuminating weatherseal (10) for selectively actuating the light emitting line (80).

75 Claims, 9 Drawing Sheets

U.S. PATENT DOCUMENTS

| | | | |
|---|---|---|---|
| 5,229,746 A * | 7/1993 | Healy et al. | 340/459 |
| 5,255,164 A * | 10/1993 | Eidelman | 362/540 |
| 5,333,227 A * | 7/1994 | Ishiharada et al. | 385/100 |
| 5,336,345 A | 8/1994 | Gustafson et al. | |
| 5,337,225 A | 8/1994 | Brookman | |
| 5,424,924 A * | 6/1995 | Ewing et al. | 362/545 |
| 5,495,400 A | 2/1996 | Currie | |
| 5,496,427 A | 3/1996 | Gustafson et al. | |
| 5,507,119 A * | 4/1996 | Sumiya et al. | 49/218 |
| 5,564,813 A | 10/1996 | Curtindale | |
| 5,580,628 A * | 12/1996 | Cordes et al. | 428/38 |
| 5,669,699 A * | 9/1997 | Pastrick et al. | 362/494 |
| 5,669,704 A * | 9/1997 | Pastrick | 362/494 |
| 5,692,327 A | 12/1997 | Wynne et al. | |
| 5,781,679 A | 7/1998 | Li et al. | |
| 5,783,312 A | 7/1998 | Laughman et al. | |
| 5,803,577 A * | 9/1998 | Stratton | 362/496 |
| 5,803,579 A * | 9/1998 | Turnbull et al. | 362/516 |
| 5,826,378 A | 10/1998 | Gallas | |
| 5,839,231 A | 11/1998 | Gebhart et al. | |
| 5,848,837 A * | 12/1998 | Gustafson | 362/235 |
| 5,864,439 A * | 1/1999 | Gold | 359/871 |
| 5,893,637 A | 4/1999 | Mizuno | |
| 5,908,216 A * | 6/1999 | Townsend | 296/146.6 |
| 5,915,830 A * | 6/1999 | Dickson et al. | 362/495 |
| 5,938,321 A * | 8/1999 | Bos et al. | 362/494 |
| 6,030,108 A * | 2/2000 | Ishiharada et al. | 362/562 |
| 6,037,865 A | 3/2000 | Heinz et al. | |
| 6,079,160 A * | 6/2000 | Bonds | 49/490.1 |
| 6,104,371 A * | 8/2000 | Wang et al. | 345/102 |
| 6,104,857 A * | 8/2000 | Ishiharada et al. | 385/147 |
| 6,132,056 A * | 10/2000 | Ruthenberg | 362/96 |
| 6,152,588 A | 11/2000 | Scifres | |
| 6,152,590 A * | 11/2000 | Furst et al. | 362/545 |
| 6,163,080 A | 12/2000 | Castellon | |
| 6,190,027 B1 | 2/2001 | Lekson | |
| 6,247,271 B1 * | 6/2001 | Fioritto et al. | 49/490.1 |
| 6,252,500 B1 | 6/2001 | Chueh et al. | |
| 6,273,433 B1 | 8/2001 | Yu | |
| 6,278,827 B1 * | 8/2001 | Sugiyama et al. | 385/123 |
| 6,310,364 B1 | 10/2001 | Uemura | |
| 6,442,902 B1 * | 9/2002 | Van Den Oord | 49/498.1 |
| 6,471,381 B1 * | 10/2002 | Atkinson et al. | 362/501 |
| 6,613,074 B1 | 9/2003 | Mitelberg et al. | |

FOREIGN PATENT DOCUMENTS

| | | | |
|---|---|---|---|
| DE | 198 41 180 | * | 3/2000 |
| DE | 19908902 | | 9/2000 |
| FR | 2356961 | | 1/1978 |
| FR | 2732927 | | 10/1996 |
| WO | WO 9707350 | | 2/1997 |

OTHER PUBLICATIONS

English language abstract for German publication DE 19744240.

English language abstract for German publication DE 19841180.

English language abstract for German publication DE 19908902.

* cited by examiner

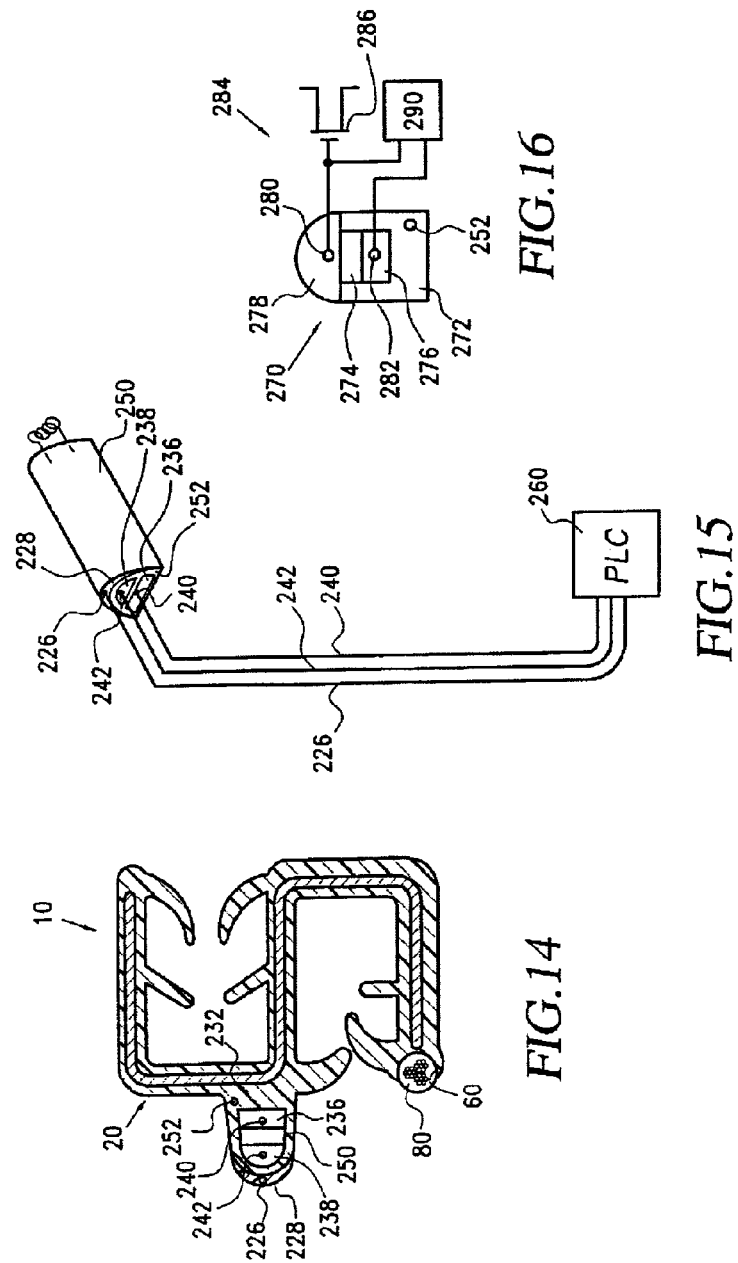

ILLUMINATING WEATHERSEAL

CROSS-REFERENCE TO RELATED APPLICATIONS

This application is the National Stage of International Application No. PCT/US02/11704, filed Apr. 12, 2002 and a continuation of U.S. application Ser. No. 09/837,039 now abandoned, filed Apr. 18, 2001 and hereby claims priority thereto.

FIELD OF THE INVENTION

The present invention relates to weatherseals, and more particularly, to a weatherseal for sealing an interface between two confronting surfaces, wherein the weatherseal includes a light line extending along a longitudinal dimension of the weatherseal for illuminating the weatherseal by emitting light along a path that defines a non zero angle with the longitudinal dimension.

BACKGROUND OF THE INVENTION

Weatherseals are employed in vehicles in a variety of locations to perform the functions of sealing and noise reduction. Traditional weatherseals may have any of a variety of constructions for performing the desired sealing. It is understood the sealing function can include reducing infiltration of water, air or particles across the barrier. Further, a portion of these weatherseals are often colored to enhance the aesthetic quality of the weatherseal. The functions of traditional weatherseals have been limited to the sealing function in combination with noise reduction and an aesthetically pleasing appearance.

However, there are additional functions, which can be performed by a weatherseal that could either reduce other previously necessary components, or add further functionality to the weatherseal.

SUMMARY OF THE INVENTION

The present invention includes an illuminating weatherseal. In a first construction, the weatherseal includes a light line extending along a longitudinal dimension of the weatherseal, wherein the light line emits light non parallel to the longitudinal dimension along the length of the weatherseal.

While the present weatherseal can have any of a variety of configurations and be located at any of a variety of locations, the weatherseal typically includes an elastomeric body having a seating channel and a light line disposed in the seating channel.

By employing an illuminating weatherseal, the weatherseal can clearly indicate the relative position of a component in a vehicle. For example, if the illuminating weatherseal is disposed about a door, when the door is opened, the illuminating weatherseal outlines the periphery of the open door, thereby enhancing visibility. Similarly, if the weatherseal is located about the periphery of a door opening on the frame of the vehicle, passengers entering or exiting the vehicle are provided guidance by the illuminated periphery. It is further contemplated the illuminating weatherseal may be used to light portions of the vehicle such as the trunk or the engine compartment. That is, if an illuminating weatherseal were disposed about the car frame to contact the trunk lid in the closed position, upon the opening the trunk, the illuminating weatherseal not only outlines at least a portion of the periphery of the trunk, but provides sufficient light to illuminate the interior of the trunk. Similarly, by locating the illuminating weatherseal about the engine compartment to seal with the hood, when the hood is raised, the weatherseal provides ready illumination of the engine. Further, the illuminating weatherseal can indicate the presence of a person adjacent the vehicle. As the person moves relative to the illuminating weatherseal, the movement and location of the person is indicated. Thus, it is believed the illuminating weatherseal can enhance the visibility of a person during a roadside stop. The illuminating weatherseal can incorporate a switch to selectively illuminate the light line. The switch can be a pressure sensitive switch, a touch sensitive switch, a capacitive switch or a combination thereof and can be integrally formed with the weatherseal.

BRIEF DESCRIPTION OF THE DRAWINGS

FIG. 14 is a cross sectional view of an illuminating weatherseal integrally incorporating a pressure sensitive switch and a touch sensitive switch.

FIG. 15 is a perspective view in partial section showing the dual mode pressure sensitive and touch sensitive switch.

FIG. 16 is a cross sectional view of an alternative configuration of the dual mode switch.

DETAILED DESCRIPTION OF THE PREFERRED EMBODIMENT

Figure 1:
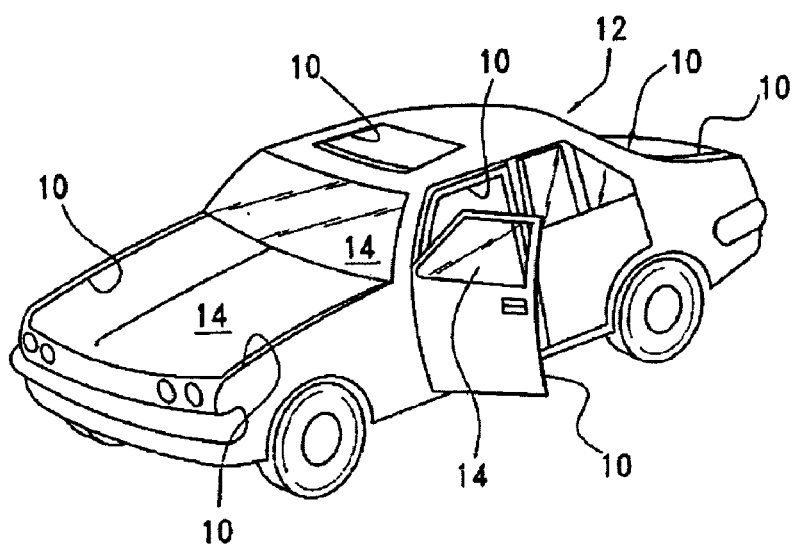
FIG. 1 is a perspective view of a vehicle showing a variety of locations for an illuminating weatherseal.
Figure 2:
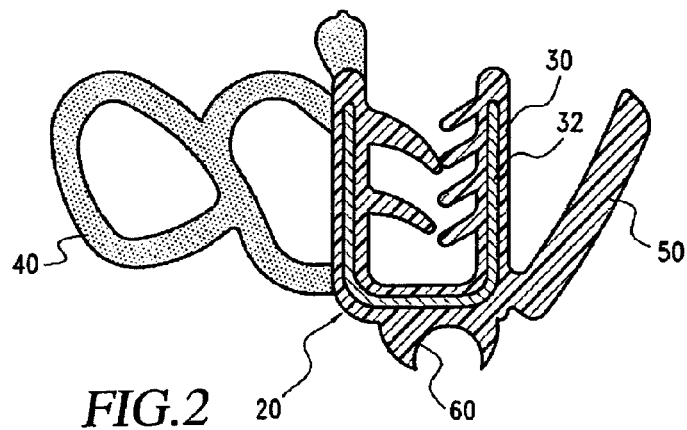
FIG. 2 is a cross-sectional view of a typical door seal configured for used in the present invention, wherein the light line is omitted.
Figure 3:
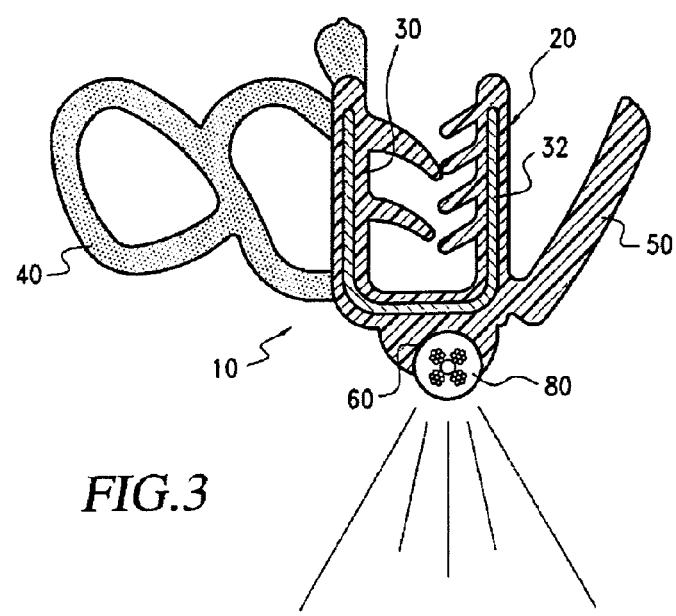
FIG. 3 is a cross-sectional view of the door seal of FIG. 2, wherein the light line is included.
Figure 4:
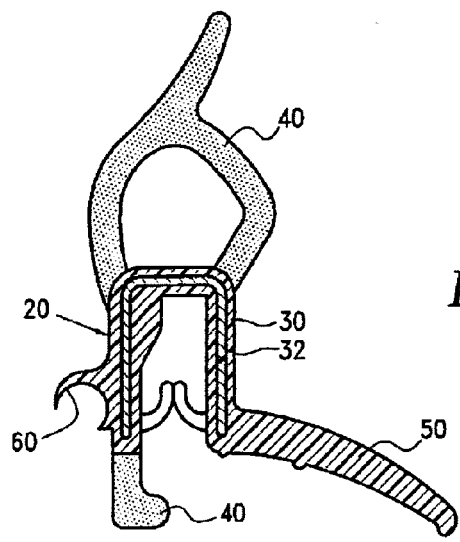
FIG. 4 is a cross-sectional view of a typical deck lid seal configured for used in the present invention, wherein the light line is omitted.
Figure 5:
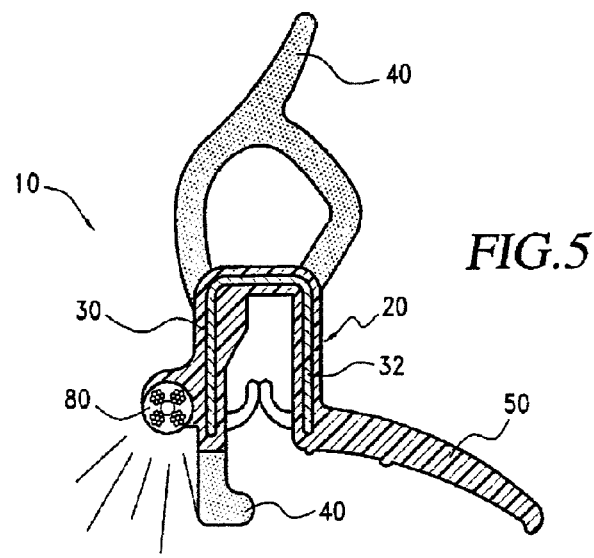
FIG. 5 is a cross-sectional view of the deck lid seal of FIG. 4 including a light line.
Figure 6:
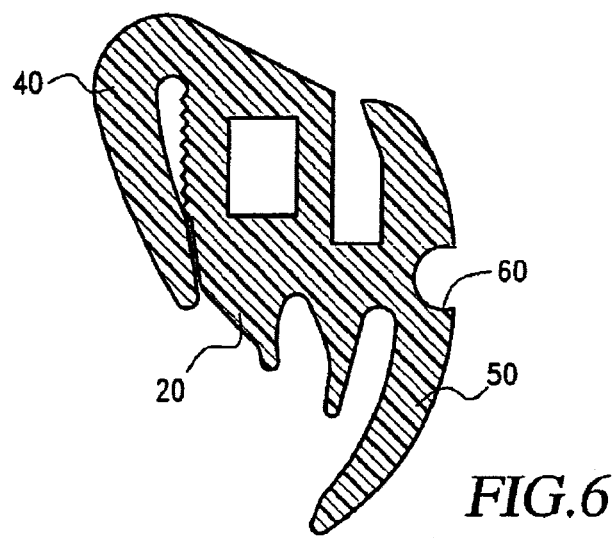
FIG. 6 is a cross-sectional view of a typical back light seal configured for used in the present invention, wherein the light line is omitted.
Figure 7:
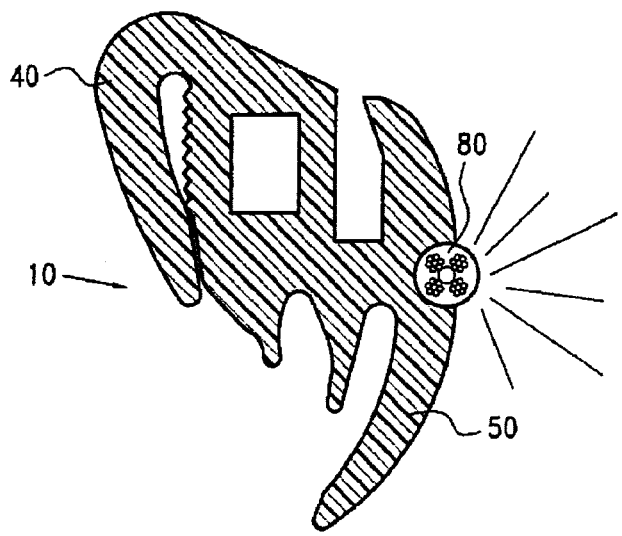
FIG. 7 is a cross-sectional view of the back light seal of FIG. 6 showing a light line incorporated in the weatherseal.
Figure 8:
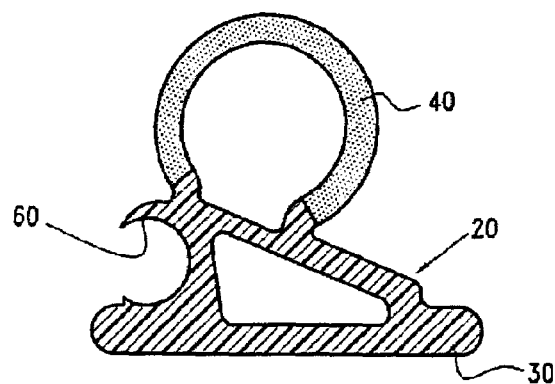
FIG. 8 is a cross sectional view of a typical channel mount construction of a weatherseal, wherein the light line is omitted.
Figure 9:
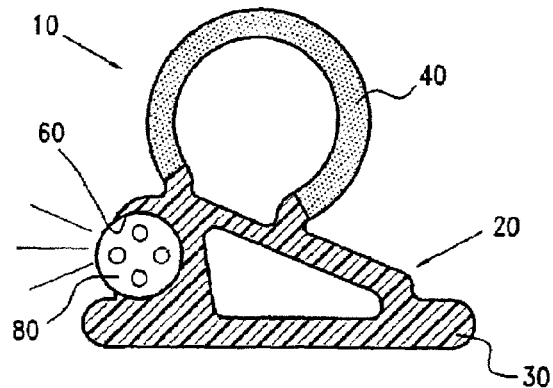
FIG. 9 is a cross sectional view of the channel mount seal of FIG. 8 showing an incorporated light line.

Referring to FIG. 1, the weatherseal 10 of the present invention can be employed in a motor vehicle 12. The weatherseal 10 can be used in a variety of locations for releasably and repeatedly engaging a panel 14. For purposes of description, the present invention is described as a weatherseal, however, it is understood the present invention can be employed in any application that may require a sealing function and include an illuminating function.

Typically, the weatherseal 10 is disposed between confronting surfaces such as panels 14. The panels 14 may be any of a variety of materials and do not limit the present invention. For example, the panel 14 may be glass, metal or a composite, which is painted, surface treated or bare. In the operating environment, the panel 14 can be brought repeatedly into and out of engagement with the weatherseal 10. Alternatively, the weatherseal 10 may be moved relative to the panel 14. Further, the weatherseal 10 and the panel 14 may be located in a substantially fixed relationship. For example, the weatherseal 10 may be located about a fixed panel 14 such as a front or rear window.

The term weatherseal includes, but is not limited to, extrusions, moldings, edge pieces, glass guidance components, glass run channels, weather strips and seals including channel mount or pin type mounted seals. The present weatherseal 10 may be used as a weather strip in structural sealing applications including residential and commercial buildings, marine vehicles as well as the motor vehicle industry. In the motor vehicle industry, the weatherseal configuration is suitable for use in many areas including, but not limited to, storage compartments, glass guidance components, glass run channels, door seals, roof rails, deck lids, hood to cowl seals, window seals, sun roof seals, van sliders, hatch backs or window channel seals. It is understood the illuminating weatherseal can be constructed and operably located in a position that does not perform a sealing function. One example of such non sealing application is a flange finisher, trim or trim piece. Typical flange finishers are disposed on a flange to provide an aesthetically pleasing appearance, as well as reduce the risks associated with an otherwise exposed flange.

Referring to FIGS. 3, 5, 7, 9, 14 and 17, the weatherseal 10 includes a body 20 and a light line 80. Typically, the weatherseal 10 is an elongate structure having a length greater than a cross sectional dimension. The weatherseal 10 thus has a longitudinal dimension and a shorter transverse dimension. Although the detailed description is directed to the sealing configuration of the invention, it is understood the same teachings can be applied to the non sealing configuration.

Body

As seen in FIGS. 2–9, 14 and 17, the body 20 is shown in cross section. The body 20 can include a carrier portion 30, a sealing portion 40 and a trim portion 50.

Typically, the carrier portion 30 is the part of the body 20, which attaches the weatherseal 10 to one of the confronting surfaces. The carrier portion 30 can have any of a variety of configurations and typically forms a base or substrate upon which the sealing portion 40 and/or trim portion 50 are connected.

The carrier portion 30 can be formed of a variety of materials including plastic, thermoplastic or thermosetting materials, including but not limited to plastic, TPE, EPDM or any combination thereof. The thermoplastic materials can include polyethylene, EVA, PVC or polypropylene. Suitable vulcanized or cross-linked (thermosetting) polymeric materials include the EPDM and modified EPDM.

The carrier portion 30 can have a relatively rigid section and a relatively soft or resilient section. That is, the carrier portion 30 can exhibit one or more durometer hardnesses. The carrier portion 30 can include a reinforcing member 32 such as a wire or metal carrier, which may be of known construction (such as knitted wire, lanced and stretched, slotted, solid (continuous) or stamped metal). It is also contemplated the carrier portion 30 can include a thermoplastic section and a thermoset section, wherein each section has a unique rigidity. Further, the carrier portion 30 can be formed at differing thicknesses to provide differing amounts of rigidity. It is contemplated the carrier portion 30 can have any of a variety of cross-sections, wherein typical cross-sections include "U" shaped, "J" shaped, "L" shaped or planar. As shown in FIGS. 2–5, the carrier portion 30 can have the U shaped profile with inwardly extending gripping fins for engaging one of the confronting surfaces. Non sealing constructions of the present invention, such as the flange finisher, can be limited to a body 20 employing only the carrier portion 30, wherein the flange finisher can be operably retained by friction, fasteners or adhesives. The body 20 in the flange finisher configuration often has a U shaped cross section with at least one gripping fin for engaging the flange.

The sealing portion 40 is connected to the carrier portion 30 and typically extends from the carrier portion to contact the remaining confronting surface. The sealing portion 40 can have any of a variety of configurations including bulbs, flaps or fingers. The sealing portion 40 can be formed to have a different durometer, or rigidity than the carrier portion 30.

The sealing portion 40 can be constructed from a variety of materials, including but not limited to TPEs, thermoplastics and thermosets, wherein the materials can be solid, foamed, cellular or a sponge construction. Typically, constructions of the invention having a body 20 and a sealing portion 40 may have one or both portions formed of an elastomeric material.

The trim portion 50 is typically connected to the carrier portion 30 and extends to overly an adjacent part of the relevant confronting surface. Although the trim portion 50 is shown attached to the carrier portion 30, it is understood the trim portion can be connected to the carrier portion, the sealing portion 40 or both. The trim portion 50 is often formed of a different color or texture than the carrier portion 30 and the sealing portion 40. The trim portion 50 can also be formed of a variety of materials including thermoplastics, thermosets and composites.

Referring to FIGS. 2–9, the body 20 further includes a seating channel 60 extending along the longitudinal dimension of the weatherseal 10. The seating channel 60 can be located in the carrier portion 30, the sealing portion 40 or the trim portion 50. However, it is contemplated the seating channel 60 will typically be located in one of the carrier portion 30 or the trim portion 50.

The seating channel 60 can extend along the entire length of the weatherseal 10 or can be disposed along predetermined lengths of the weatherseal. In addition, the seating channel 60 can be located at given relative position on the weatherseal 10. Alternatively, the location of the seating channel 60 can vary along the longitudinal dimension of the weatherseal 10.

Figure 10:
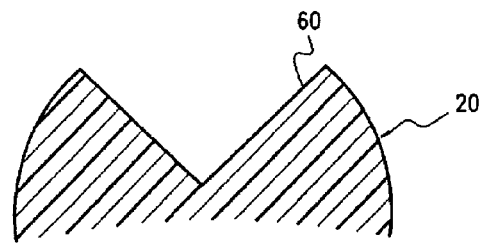
FIG. 10 is a cross sectional view of an alternative construction of the sealing channel.
Figure 11:
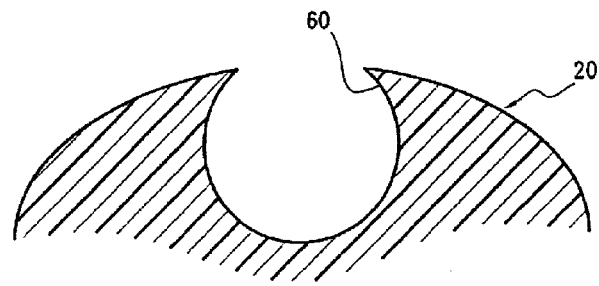
FIG. 11 is a cross sectional view of a further construction of the seating channel.
Figure 12:
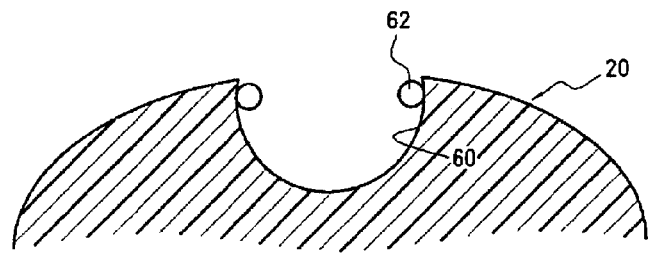
FIG. 12 is a cross sectional view of the seating channel with retaining features.
Figure 13:
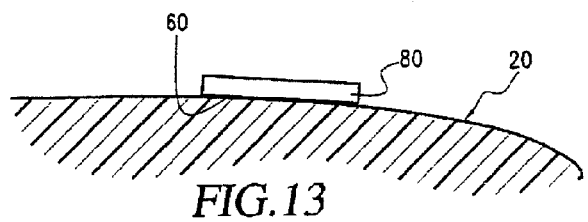
FIG. 13 is a cross sectional view of the seating channel in a non recessed configuration with an operably located light line.
Figure 17:
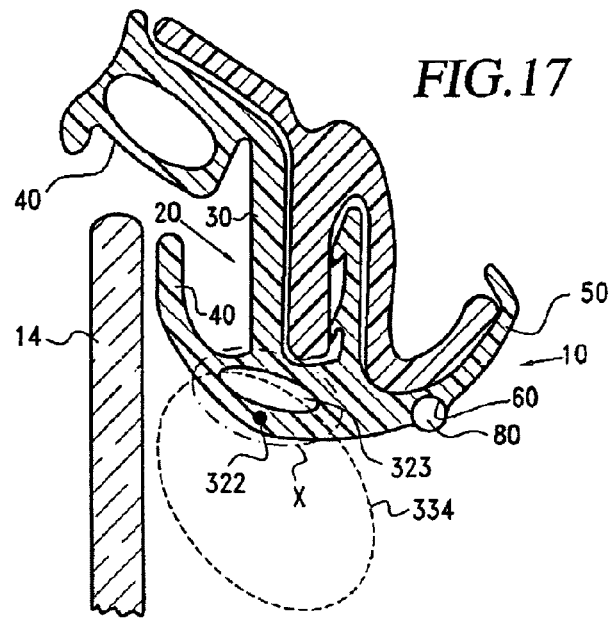
FIG. 17 is a cross sectional view of a weatherseal assembly including the light line and integrated switch.
Figure 18:
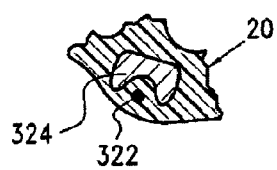
FIG. 18 is an enlarged view of a portion of FIG. 17 showing an alternative structure of the switch.
Figure 19:
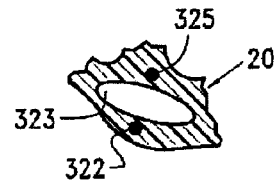
FIG. 19 is an enlarged view of a portion of FIG. 17 showing a further structure of the switch.
Figure 20:
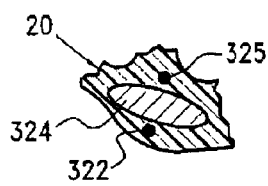
FIG. 20 is an enlarged view of a portion of FIG. 17 showing a further alternative structure of the switch.
Figure 21:
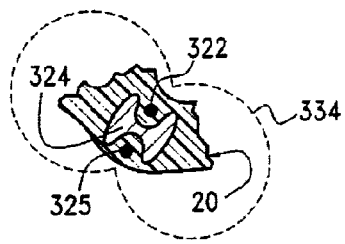
FIG. 21 is an enlarged view of a portion of FIG. 17 showing another structure of the switch.
Figure 22:
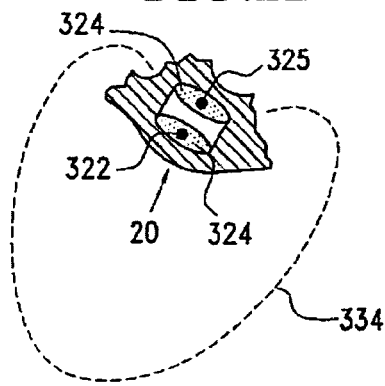
FIG. 22 is an enlarged view of a portion of FIG. 17 showing another alternative structure of the switch.
Figure 23:
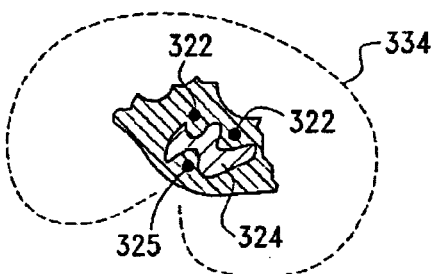
FIG. 23 is an enlarged view of a portion of FIG. 17 showing an additional structure of the switch.
Figure 24:
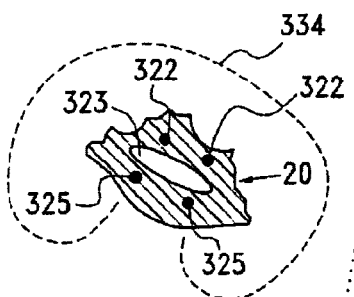
FIG. 24 is an enlarged view of a portion of FIG. 17 showing a further additional structure of the switch.
Figure 25:
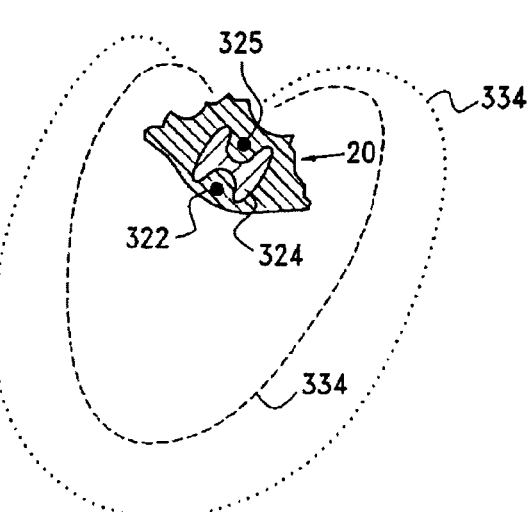
FIG. 25 is an enlarged view of a switch structure showing a representative sensing region.

The seating channel 60 can have any of a variety of cross-sections, as dictated by the corresponding light line 80 and the elastomeric body 20. Thus, referring to FIGS. 10–13, the seating channel 60 can have an arcuate, curvilinear or multi-facet cross-section. Further, as shown in FIG. 10, the seating channel 60 can include retaining features 62 such as flaps, detents, ridges, barbs or fingers which project into the seating channel. The retaining features 62 can be located along the length of the seating channel 60 or disposed at spaced locations. Further, the seating channel 60 can be formed with a lip or overhang to engage a diameter or dimension of the light line 80. The seating channel 60 can thus be defined by a recessed area of the body 20. However, as seen in FIG. 13, the seating channel 60 can be defined merely by a surface of the body 20 to which the light line 80 is connected or attached.

Depending on the intended operating parameters, the seating channel 60 can be formed or located on the body 20 by any of a variety of mechanisms, including but not limited to molding, extrusion, machining, etching or ablation.

Light Line

Referring to FIGS. 3, 5, 7, 9, 14 and 17, the light line 80 is disposed in the seating channel 60 of the elastomeric body 20. Similar to the weatherseal 10, the light line 80 is also an elongate structure having a longitudinal dimension and a transverse dimension, wherein the longitudinal dimension is substantially greater than the transverse dimension.

The light line 80 can be retained within the seating channel 60 by a variety of mechanisms including adhesives, bonding or mechanical retention. Depending upon the hardness or resiliency of the elastomeric body 20 in which the seating channel 60 is formed, the light line 80 may be retained by friction or a snap fit. Additionally, or alternatively, the light line 80 can be retained in the seating channel 60 by an adhesive.

Although the light line 80 is shown as having a generally circular cross-sectional profile, it is understood the light line can have a multi-facet, curvilinear, oval, obround, triangular, square, rectangular or other such cross-section. Further, the relative cross-sectional area of the light line 80 relative to the weatherseal 10 is dependent upon a number of parameters including the desired illumination, the construction of the light line as well as construction of the body 20.

The light line 80 can be active such as self-illuminating or passive and merely transmit and emit light, and thus be, formed of a variety of light emitting devices. Depending upon the amount of lighting required, a variety of constructions can be used as the light line 80. Preferably, the light line 80 emits light along a path that defines a non-zero angle with the longitudinal dimension or axis. The optical path of the emitted light will intersect the longitudinal axis. Therefore, the light line 80 emits light along paths that are non parallel to the longitudinal dimension. The light passes from the light line 80 along the length of the light line. That is, light passes from the light line 80 intermediate the ends of the light line. The areas or sections of light emission can be determined in response to the intended operating characteristics of the weatherseal. The self-illuminating configuration of the light line 80 can include light ropes, LEDs and LED strings. Transmitting/emitting light lines 80 can include fiber optics and side emitting fiber optics, such as glass plastic or composites.

It is understood the light line 80 can include intermittent or discrete light sources extending along the longitudinal dimension of the light line. The light line 80 can thereby provide a plurality of points of light along the longitudinal dimension. Thus, the light line 80 can be selected to provide substantially continuous light emission along the longitudinal dimension, intermittent light or an intermediate light dispersion along the longitudinal dimension.

The light line 80 is shown as a side-emitting device. That is, the light line 80 emits light transverse to the longitudinal dimension of the light line, and hence weatherseal 10, such that the light travels along a path that defines a non-zero angle with the longitudinal dimension. In such construction, the body 20 can be formed without specific characteristics for enhancing light emission. However, it is understood the body 20 can be formed with reflective surfaces to enhance light emission. For example, the seating channel 60 can be coated with or formed of a light reflective material. In addition, the light line 80 can include reflective surfaces to control direction of emitted light.

Alternatively, the seating channel 60 can be formed of or coated with a light absorbing material to reduce light transmission.

Similarly, the cross sectional profile of the seating channel 60 can be structured to enhance or inhibit light transmission as dictated by the intended operating environment and the structure of the particular light line 80.

Thus, the illuminating weatherseal 10 emits light non parallel to the longitudinal axis. It is contemplated the light line 80 will be constructed to emit light along a path that defines a non zero angle with respect to the longitudinal axis. Therefore, the light may be emitted along a path that is transverse or oblique to the longitudinal axis.

Transmitting/emitting light lines 80 cooperate with a light source. The light source can be dedicated to the light line 80. Alternatively, the light source can be employed for additional uses such as courtesy lights, warning lights or dome lights. The light source can be any of a variety of types such as incandescent, fluorescent, LED or lasing.

As seen in FIGS. 3, 5, 7, 9, 14 and 17, the body 20 has a given cross sectional area, wherein the light line 80 has a cross sectional area less than the body. Preferably, the cross sectional area of the light line 80 is less than approximately 50 percent of the cross sectional area of the body 20. It is contemplated the cross sectional area of the light line 80 can be 20 percent or less of the cross sectional area of the body 20. Thus, the light line 80 does not contribute significantly to the cross sectional area of the weatherseal. Further, it is contemplated, the light line 80 can be located within the cross sectional area of the weatherseal. Therefore, the present illuminating weatherseal can be operably located along any existing weatherseal location.

In a preferred construction, the light line 80 extends along substantially the entire length of the weatherseal. While the light line 80 can extend the length of the weatherseal, the entire length or intermittent portions can be illuminating.

The emission of light from the light line 80 can be controlled by a variety of mechanisms, wherein the mechanism actuates the light source or the optical interconnection of the light line 80 to the light source. Capacitive, pressure or contact switches can be employed with the illuminating weatherseal 10 to selectively provide illumination wherein the switch can be integral with or external to the weatherseal. In addition, light line 80 can be controlled to provide any of a variety of light characteristics such as dimming, pulsing, chasing, blinking or constant.

For example, the light line 80 can be illuminated in response to an opening or closing of a door. Alternatively, the light line 80 can be illuminated for a timed interval in response to a predetermined condition or event.

A switch mechanism for controlling the emission of light from the light line 80 can be incorporated into the weatherseal 10. The switch mechanism can include a pressure or deflection type switch, a touch sensitive switch, a capacitive switch or a combination of pressure and touch sensitive switches. In a preferred construction, the switch is integral with the body 20. It is contemplated the switch can extend along the length of the body 20, or along selected portions.

Referring to FIG. 14, a combined pressure sensitive and touch sensitive switch is shown. Although the pressure sensitive and touch sensitive switches are shown in combination, it is understood either switch can be individually employed. In addition, the pressure sensitive, touch sensitive or combined switch can be located on any of the carrier portion 30, the sealing portion 40 or the trim portion 50. For purposes of clarity, the combined pressure sensitive and touch sensitive switch is shown on the carrier portion.

The combined switch is provided with a bead of conductive rubber 228 extending along at outer surface of the switch. An electrical conductor 226 is preferably embedded in the conductive layer 228. Preferably, the weatherseal 10 is extruded, and the conductive rubber bead can be co-extruded therewith. Elastomers, thermoplastic elastomers, or thermoplastics can be used for the touch sensitive portion, and the conductivity of such materials can be increased by adding conductive materials such as carbon blacks, graphite or metal powder to a base material. The combination of the electrical conductor or wire 226 with the conductive rubber bead 228 forms an elongated conductive surface portion extending substantially along the length of the profile. While the electrical conductor is shown as embedded in the elongated conductor surface portion, it can be disposed between the non-conductive and conductive portions, as long as it is in electrical contact with the conductive portion.

Optionally, as seen in FIG. 14, a second electrical conductor 252 is provided in a non-conducting portion 232 of the weatherseal 10. The conductor 252 may be conveniently employed to form a complete electrical circuit, depending on the type of sensor employed.

FIG. 15 is diagrammatic inasmuch as it only shows the switch portion of the weatherseal in accordance with the invention. Referring to FIG. 15, a pressure sensitive switch is implemented by conductive region 236 and 238, each of which includes an embedded or contacting electrical conductor 240 and 242 respectively. The conductor regions are encased within a hollow flexible tubular portion 250 of the weatherseal, which has flexible side walls such that upon the application of pressure, the conductive regions 236 and 238 are brought into contact with each other, which contact can be sensed remotely as a drop in resistance of the circuit formed by electrical conductors 240 and 242. The touch sensitive conductive layer 228 is formed on the surface of the hollow tubular member 250 and has its own electrically conductive wire embedded therein or at least in electrical contact therewith. If desired, yet another electrical wire 252 can be provided in non-conducting tubing member 250 for forming a complete circuit with wire 226.

As shown in FIG. 15, the sensing portion 250 of the switch is connected to a detector circuit 260. A portion of detector circuit 260 that is responsive to pressure induced contact being formed between conductive regions 236 and 238 is well known, and will not be described further. The portion of detector 260 that is responsive to touch sensitive region 228 may take a variety of forms. Touch sensors for operating table lamps and the like are well known, and sensors of similar design can be employed in connection with this invention. Since only low voltage power is usually available in vehicles, the touch sensitive switch may be implemented by connecting the electrical wire running through the touch sensitive layer of the device to the gate of a field effect transistor or the like, so that the transistor will be turned on when the layer is touched.

Referring to FIG. 16, a dual mode switch in accordance with another embodiment is illustrated in diagrammatic cross section form. The switch indicated generally at 270 includes a non-conductive resilient body formed from thermoplastic or thermosetting material. A channel 274 is formed in the non-conductive body and a layer of conductive material such as a conductive rubber foam is disposed in a bottom portion of the channel. A touch sensitive cap 278 is attached to the upper side walls of the channel. A first electrical conductor 280 is embedded in touch sensitive cap 278 and a second electrical conductor 282 is embedded in layer 276. Electrical conductor 280 is connected to a touch sensitive detector 284 designated in this example by a connection to the gate of the FET 286. A pressure sensitive detector 290, preferably for responding to a contact closure is connected to electrodes 280 and 282. In operation, the dual mode detector switch of FIG. 14 is responsive to contact with conductive layer 278 by triggering FET 286 to produce a switching signal. The dual mode switch is responsive to pressure sufficient to cause the side walls of the channel formed in the base 272 to flex and the conductive layers 278 and 276 to be brought into contact, to trigger detector 290 also to generate a switching signal.

In a further configuration, and generally referring to FIGS. 17–25, the switch can be formed of a ground electrode 325 and a spaced sensor electrode 322, wherein the sensor electrode is embedded in the body 20, and the weatherseal 10 includes a zone or area 323, 324 of reduced rigidity between the ground electrode and the sensor electrode. The zone of reduced rigidity can be formed by an air gap 323, a strip of a sponge rubber 324 extending along the longitudinal dimension of the weatherseal 10.

It is contemplated the ground electrode 325 can be separately constructed from the weatherseal 10. That is, a portion of the vehicle can be employed as the ground electrode 325. The sensor electrode 322 can be embedded in the carrier portion 30, the sealing portion 40 or the trim portion 50. In addition, the sensor electrode 322 can be configured as a loop.

The ground electrode 325, the sensing electrode 322 and the zone of reduced rigidity 323, 324 create a sensing region 334 which, upon sensing a dielectric material within the region, can initiate a signal to selectively illuminate the light line 80. The sensing region 334 can be varied or shaped by arranging and/or changing the number of ground electrodes or sensor electrodes. The sensing region 334 can additionally be varied or shaped by applying different potentials to the ground electrode and or the sensing electrode.

Thus, the capacitive switch detects a dielectric material entering the sensing region 334, without requiring physical contact, by a change in capacitance between the sensor electrode 322 and the ground electrode 325. Upon the presence of the dielectric object, the capacity will rise, which can be used to selectively illuminate or dim the light line 80.

Thus, the illuminating weatherseal 10 can be activated through a switch integrated with the weatherseal. The switch can be activated by a flexing of the weatherseal, or location of a dielectric material adjacent the weatherseal.

Manufacture

The particular method for constructing the illuminating weatherseal 10 is at least partially determined by the construction of the light line 80 and intended interconnection between the light line and the seating channel 60.

The weatherseal 10 can be formed in an extrusion process to include the seating channel 60, wherein the light line 80 is disposed within the seating channel in a downstream operation. It is contemplated that for an elastomeric body 20 formed of a thermosetting material, a curing step can be performed prior to, during, or subsequent to insertion of the light line 80 into the seating channel 60.

Alternatively, the elastomeric body 20 and corresponding seating channel 60 can be formed, wherein an adhesive is subsequently disposed in the seating channel and the light line is then disposed in the seating channel to contact the adhesive.

Alternatively, the seating channel 60 can be machined into the body 20 in a subsequent process, and the light line 80 then located in the seating channel.

With respect to the switch mechanism, the components of the switch can be formed with the body 20, as for example during extrusion.

While the invention has been described in connection with a presently preferred embodiment thereof, those skilled in the art will recognize that many modifications and changes made be made therein without departing from the true spirit and scope of the invention, which accordingly is intended to be defined solely by the appended claims.

The invention claimed is:

1. An automotive weatherseal in a gap intermediate a first and a second confronting surface of an automobile, the first and second confronting surfaces relatively moveable between a spaced apart open position and an adjacent closed position, one of the confronting surfaces defining an opening of the automobile, the opening having a threshold, the automotive weatherseal sealing the gap when of the first and second confronting surfaces are in the adjacent closed position, the automotive weatherseal, comprising:
   (a) an elongate polymeric body attached to the first confronting surface, the polymeric body including a sealing portion spaced from the second confronting surface in the spaced apart open position of the confronting surfaces and the sealing portion contacting the second confronting surface in the adjacent closed position of the confronting surfaces, the polymeric body including an elongate seating channel extending along a longitudinal dimension of at least a portion of the polymeric body, the seating channel longitudinally extending to a location spaced from the threshold; and
   (b) an elongate light generating line disposed in the seating channel at the location spaced from the threshold and having a longitudinal axis with a portion thereof extending generally parallel to longitudinal dimension.

2. The automotive weatherseal of claim 1, wherein the light line transmits light.

3. The automotive weatherseal of claim 1, wherein the polymeric body includes a carrier portion.

4. The automotive weatherseal of claim 3, wherein the carrier portion includes a reinforcing member.

5. The automotive weatherseal of claim 4, wherein the reinforcing member is a metal or a thermoplastic.

6. The automotive weatherseal of claim 1, wherein the light generating line is one of a fiber optic, a light emitting diode and an incandescent element.

7. The automotive weatherseal of claim 6, wherein the fiber optic is one of a glass or a plastic.

8. The automotive weatherseal of claim 1, wherein the light generating line includes a side-emitting fiber optic cable.

9. The automotive weatherseal of claim 1, wherein the polymeric body includes a trim portion.

10. The automotive weatherseal of claim 1, further comprising a switch integral with the polymeric body.

11. The automotive weatherseal of claim 10, wherein the switch is one of a pressure sensitive switch, a capacitive switch and a touch sensitive switch.

12. The automotive weatherseal of claim 10, wherein the switch creates a switching signal to control illumination of the light generating line.

13. The automotive weatherseal of claim 1, wherein the light line emits light along the threshold.

14. An automotive weatherseal assembly in a gap intermediate a first and a second confronting surface of an automobile, the first and second confronting surfaces relatively moveable between a spaced apart open position and an adjacent closed position, one of the confronting surfaces defining an opening of the automobile, the opening having a threshold and the automotive weatherseal assembly sealing the gap when the first and second confronting surfaces are in the adjacent closed position, the automotive weatherseal assembly comprising:
   (a) a weatherseal body attached to the first confronting surface and having a longitudinal dimension extending longitudinally beyond the threshold, the weatherseal body including a sealing portion contacting the second confronting surface when the first and second confronting surfaces are in the adjacent closed position; and
   (b) a light generating line mounted on at least a portion of the body longitudinally beyond the threshold and having a longitudinal axis with a portion of the axis extending generally parallel to said longitudinal dimension.

15. The automotive weatherseal assembly of claim 14, wherein the weatherseal body is polymeric and includes a carrier portion.

16. The automotive weatherseal assembly of claim 15, wherein the carrier portion includes a seating channel sized to receive the light line.

17. The automotive weatherseal assembly of claim 14, wherein the light line includes a fiber optic.

18. The automotive weatherseal assembly of claim 14, wherein the light line includes a side emitting fiber optic.

19. The automotive weatherseal assembly of claim 14, further comprising a switch integral with the body.

20. The automotive weatherseal assembly of claim 14, wherein the switch is one of a capacitive switch, a pressure switch and a touch sensitive switch.

21. The automotive weatherseal assembly of claim 14, wherein the light line extends along a portion of the threshold.

22. An automotive weatherseal assembly in a gap intermediate a first and a second confronting surface of an automobile, the first and second confronting surfaces relatively moveable between a spaced apart open position and an adjacent closed position, one of the confronting surfaces defining an opening of the automobile, the opening having a threshold and the automotive weatherseal assembly sealing the gap when the first and second confronting surfaces are in the adjacent closed position, the automotive weatherseal assembly comprising:
  (a) a weatherseal body having a sealing surface disposed along the opening at least when the confronting surfaces are in the adjacent closed position; and
  (b) an elongate light emitting line extending along a longitudinal dimension of the weatherseal body at a location longitudinally spaced from the threshold, wherein the light line has a longitudinal axis with a portion thereof extending generally parallel to said longitudinal dimension.

23. The automotive weatherseal assembly of claim 22, wherein the weatherseal body includes a polymeric body connected to the light emitting line.

24. The automotive weatherseal assembly of claim 23, wherein the weatherseal body is includes an elongate seating channel sized to receive the light emitting line.

25. The automotive weatherseal assembly of claim 22, wherein the light emitting line is one of a fiber optic, a light emitting diode and an incandescent element.

26. The automotive weatherseal assembly of claim 22 further comprising a switch integral with the weatherseal body.

27. The automotive weatherseal assembly of claim 26, wherein the switch is one of a capacitive switch, a pressure sensitive switch and a touch sensitive switch.

28. An automotive trim piece engaging a flange extending around an opening in an automobile, the opening having a threshold, the trim piece comprising:
  (a) an elongate polymeric body having a longitudinal axis and a flange engaging section extending transverse to the longitudinal axis, the polymeric body connected to the flange at a position longitudinally spaced from the threshold;
  (b) a reinforcing member connected to the polymeric body; and
  (c) an elongate light emitting line connected to the polymeric body at the position longitudinally spaced from the threshold to emit light along a path non-parallel to the longitudinal axis wherein the light line has a longitudinal axis, a portion of which extends generally parallel to said longitudinal axis of said body.

29. The automotive trim piece of claim 28, wherein the light line is a side-emitting fiber optic.

30. The automotive trim piece of claim 28, further comprising a gripping fin extending from the polymeric body.

31. The automotive trim piece of claim 28, wherein the reinforcing member is embedded in the polymeric body.

32. The automotive trim piece of claim 28, wherein the reinforcing member is a metal or a thermoplastic.

33. The automotive trim piece of claim 28, wherein the light line includes one of a fiber optic, an LED, a fluorescent element, and an incandescent element.

34. The automotive trim piece of claim 33, wherein the fiber optic is one of a glass or a plastic.

35. The automotive trim piece of claim 28, further comprising a switch integral with the body.

36. The automotive trim piece of claim 35, wherein the switch is one of a pressure sensitive switch, a capacitive switch and a touch sensitive switch.

37. An automotive weatherseal in a gap intermediate a first and a second confronting surface of an automobile, the first and second confronting surfaces relatively moveable between a spaced apart open position and an adjacent closed position, and one of the first and the second confronting surfaces defining an opening of the automobile, the opening having a threshold and the automotive weatherseal sealing the gap when the first and second confronting surfaces are in the adjacent closed position, the automotive weatherseal comprising:
  (a) an elongate polymeric body attached to the first confronting surface, the polymeric body including a sealing portion spaced from the second confronting surface in the spaced apart open position of the confronting surfaces and the sealing portion contacting the second confronting surface in the adjacent closed position of the confronting surfaces, the polymeric body including an elongate seating channel extending along a longitudinal dimension of the polymeric body and having a portion thereof longitudinally spaced from the threshold; and
  (b) an elongate light emitting line disposed in the seating channel in said portion following and having a longitudinal axis with a portion thereof extending generally parallel to said longitudinal dimension.

38. The automotive weatherseal of claim 37, wherein the polymeric body includes a trim portion.

39. The automotive weatherseal of claim 37, wherein the polymeric body includes a carrier portion.

40. The automotive weatherseal of claim 39, wherein carrier portion includes a reinforcing member.

41. The automotive weatherseal of claim 40, wherein the reinforcing member is a metal or a thermoplastic.

42. The automotive weatherseal of claim 37, wherein the light line includes at least one of a fiber optic, a light emitting diode and an incandescent element.

43. The automotive weatherseal of claim 42, wherein the fiber optic is one of a glass or a plastic.

44. The automotive weatherseal of claim 37, wherein the light line is a side-emitting fiber optic cable.

45. An automotive weatherseal assembly in a gap intermediate a first and a second confronting surface of an automobile, the first and second confronting surfaces relatively moveable between a spaced apart open position and an adjacent closed position, and one of the first and the second confronting surfaces defining an opening of the automobile, the opening having a threshold and the automotive weatherseal assembly sealing the gap when the first and second confronting surfaces are in said closed position, the weatherseal assembly comprising:
  (a) a weatherseal body connected to the first confronting surface; and
  (b) an elongate light emitting line having a longitudinal axis, a portion of which extends generally parallel to a longitudinal dimension of at least a portion of the weatherseal body longitudinally spaced from the threshold.

46. The automotive weatherseal assembly of claim 45, wherein the weatherseal body includes a polymeric body connected to the light line.

47. The automotive weatherseal assembly of claim 46, wherein the polymeric body includes a seating channel sized to receive the light line.

48. The automotive weatherseal assembly of claim 45, wherein the light line includes one of a fiber optic, a light emitting diode and an incandescent element.

49. An automotive weatherseal in a gap intermediate a first and a second confronting surface of an automobile, the first and second confronting surfaces relatively moveable between a spaced apart open position and an adjacent closed position and one of the confronting surfaces defining an opening of the automobile, the opening having a threshold and the automotive weatherseal sealing the gap when the first and second confronting surfaces are in the adjacent closed position, the automotive weatherseal, comprising:
- (a) an elongate polymeric body attached to the first confronting surface and longitudinally spaced from the threshold, the polymeric body including a sealing portion spaced from the second confronting surface in the spaced apart open position of the confronting surfaces and the sealing portion contacting the second confronting surface in the adjacent closed position of the confronting surfaces; and
- (b) an elongate light emitting line connected to the polymeric body longitudinally spaced from the threshold and having a longitudinal axis with a portion thereof extending generally parallel to a longitudinal axis of said body.

50. The automotive weatherseal of claim 49, wherein the polymeric body includes a carrier portion.

51. The automotive weatherseal of claim 50, wherein the carrier portion includes a reinforcing member.

52. The automotive weatherseal of claim 51, wherein the reinforcing member is a metal or a thermoplastic.

53. The automotive weatherseal of claim 49, wherein the light line includes at least one of a fiber optic, a light emitting diode and an incandescent element.

54. The automotive weatherseal of claim 53, wherein the fiber optic is one of a glass or a plastic.

55. The automotive weatherseal of claim 49, wherein the light line is a side-emitting fiber optic cable.

56. The automotive weatherseal of claim 49, wherein the polymeric body includes a trim portion.

57. The automotive weatherseal of claim 49, wherein the light line extends along less than an entire length of the polymeric body.

58. An automotive weatherseal in a gap intermediate a first and a second confronting surface of an automobile, the first and second confronting surfaces relatively moveable between a spaced apart open position and an adjacent closed position, one of the confronting surfaces defining an opening of the automobile, the opening having a threshold and the automotive weatherseal sealing the gap when the first and second confronting surfaces are in the adjacent closed position, the automotive weatherseal, comprising:
- (a) an elongate polymeric body attached to the first confronting surface, the polymeric body including a sealing portion spaced from the second confronting surface in the spaced apart open position of the confronting surfaces and the sealing portion contacting the second confronting surface about a majority of the opening in the adjacent closed position of the confronting surfaces; and
- (b) an elongate light generating line connected to a length of the polymeric body at a location longitudinally spaced from the threshold and having a longitudinal axis with a portion thereof extending generally parallel to a longitudinal axis of said body.

59. The automotive weatherseal of claim 58, wherein the light generating line emits light.

60. The automotive weatherseal of claim 58, wherein the polymeric body includes a carrier portion.

61. The automotive weatherseal of claim 60, wherein the carrier portion includes a reinforcing member.

62. The automotive weatherseal of claim 61, wherein the reinforcing member is a metal or a thermoplastic.

63. The automotive weatherseal of claim 58, wherein the light generating line is one of a fiber optic, a light emitting diode and an incandescent element.

64. The automotive weatherseal of claim 63, wherein the fiber optic is one of a glass or a plastic.

65. The automotive weatherseal of claim 63, wherein the light generating line includes a side-emitting fiber optic cable.

66. The automotive weatherseal of claim 58, wherein the polymeric body includes a trim portion.

67. An automotive weatherseal intermediate a door and a confronting surface of a vehicle defining an opening of the vehicle the opening including a threshold, the door moveable between an open position and a closed position, the weatherseal comprising:
- (a) an elongate polymeric body attached to the door and sealing against the confronting surface of the vehicle when the door is in the closed position; and
- (b) an elongate light emitting line mounted on a portion of the polymetric body which is longitudinally spaced from said threshold and having a longitudinal axis with a portion thereof generally parallel to a longitudinal axis of said body.

68. The automotive weatherseal of claim 67, wherein the light line transmits light.

69. The automotive weatherseal of claim 67, wherein the polymeric body includes a sealing portion for sealing a gap between the door and the confronting surface when the door is in the closed position.

70. The automotive weatherseal of claim 67, wherein the door slides relative to the confronting surface.

71. The automotive weatherseal of claim 67, wherein the door rotates relative to the confronting surface.

72. The automotive weatherseal of claim 67, wherein the light line generates light.

73. The automotive weatherseal of claim 1, 37, 49 or 58, wherein the polymeric body includes at least one of a plastic, thermoplastic, thermosetting, thermoplastic elastomer, ethylene-propylene-diene-monomer, ethylene vinyl acetate, polyvinyl chloride, and polypropylene.

74. The automotive weatherseal of claim 1 or 3, wherein the light generating line extends along less than an entire length of the polymeric body.

75. The automotive weatherseal of claim 37 or 58, wherein the light line extends along less than an entire length of the polymeric body.

* * * * *